US009321167B2

(12) United States Patent
Scelsi et al.

(10) Patent No.: US 9,321,167 B2
(45) Date of Patent: Apr. 26, 2016

(54) PALLET-BASED SUPPORT SYSTEM FOR VEHICLE ENGINE AND METHOD

(71) Applicants: John Michael Scelsi, Moody, AL (US); Brian Gregory Jones, Talladega, AL (US)

(72) Inventors: John Michael Scelsi, Moody, AL (US); Brian Gregory Jones, Talladega, AL (US)

(73) Assignee: Honda Motor Co., Ltd., Tokyo (JP)

( * ) Notice: Subject to any disclaimer, the term of this patent is extended or adjusted under 35 U.S.C. 154(b) by 371 days.

(21) Appl. No.: 13/839,569

(22) Filed: Mar. 15, 2013

(65) Prior Publication Data

US 2014/0259663 A1 Sep. 18, 2014

(51) Int. Cl.
*B25H 1/00* (2006.01)
*B25H 1/08* (2006.01)
*B25H 1/10* (2006.01)
*B23Q 1/25* (2006.01)

(52) U.S. Cl.
CPC ............... *B25H 1/0007* (2013.01); *B23Q 1/25* (2013.01); *B25H 1/08* (2013.01); *B25H 1/10* (2013.01); *Y10T 29/49231* (2015.01); *Y10T 29/53983* (2015.01); *Y10T 29/53991* (2015.01)

(58) Field of Classification Search
CPC .......... B25H 1/0007; B25H 1/08; B25H 1/10; B23Q 1/25; Y10T 29/53983; Y10T 29/53991; Y10T 29/49231
See application file for complete search history.

(56) References Cited

U.S. PATENT DOCUMENTS

| 1,469,734 | A | | 10/1923 | Staley |
| 1,481,503 | A | | 1/1924 | Carswell et al. |
| 1,600,835 | A | | 9/1926 | Manley |
| 1,812,585 | A | | 6/1931 | Collins |
| 2,568,508 | A | | 9/1951 | Montague |
| 2,654,147 | A | | 10/1953 | Wilson et al. |
| 2,991,994 | A | | 7/1961 | Kulp |
| 3,218,056 | A | | 11/1965 | Kaplan et al. |
| 3,719,356 | A | * | 3/1973 | Winstead et al. ............... 269/48 |
| 4,033,531 | A | | 7/1977 | Levine |
| 4,887,341 | A | | 12/1989 | Sakimori et al. |
| 4,907,372 | A | | 3/1990 | Molitor et al. |
| 5,321,874 | A | | 6/1994 | Mills et al. |
| 5,851,007 | A | * | 12/1998 | Swartzlander et al. ......... 269/17 |
| 6,572,092 | B2 | * | 6/2003 | DuVernay et al. ............... 269/71 |
| 7,237,758 | B2 | | 7/2007 | Nikolic |
| 7,377,502 | B2 | | 5/2008 | Nikolic |
| 7,798,479 | B1 | | 9/2010 | Meeks et al. |
| 2003/0062663 | A1 | | 4/2003 | Fox |

* cited by examiner

Primary Examiner — Ryan J Walters
(74) Attorney, Agent, or Firm — Armstrong Teasdale LLP

(57) ABSTRACT

A pallet-based support system for use in assembling a vehicle engine that includes an engine block is described herein. The pallet-based support system includes a first jig and a second jig configured to couple to the engine block. The system also includes a first support arm and a second support arm extending from the pallet and each of the support arms includes a cradle structure. The system also includes a first adapter structure coupled to the first jig. The first adapter structure is configured to be releasably coupled to one of the cradle structures by lowering the engine block towards the pallet. The first adapter structure engages the cradle structure and is configured to be positioned in at least three orientations with respect to the cradle structure.

14 Claims, 6 Drawing Sheets

Position 3

Position 4

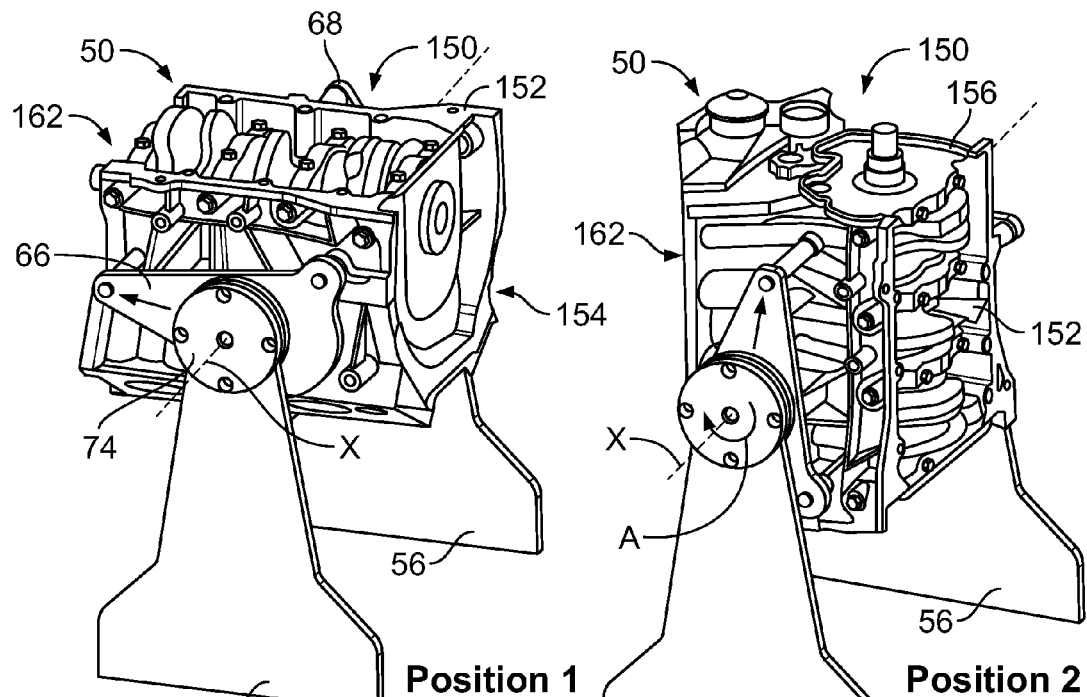
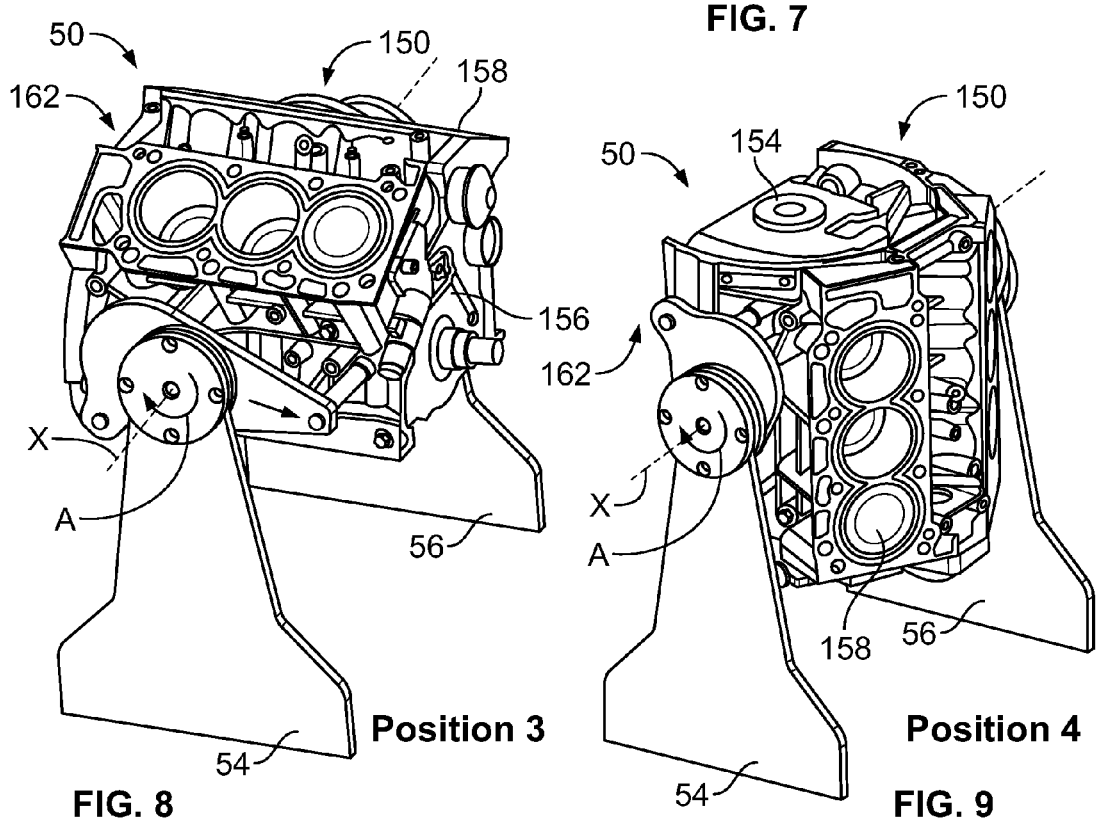

PALLET-BASED SUPPORT SYSTEM FOR VEHICLE ENGINE AND METHOD

BACKGROUND

The field of the disclosure relates generally to automobiles, and more specifically, to a component handling system for use with vehicle engines.

At least some known vehicle engines include an engine block and a plurality of components that are inserted into the engine block. Moreover, at least some known vehicle engines also include components that are coupled to an exterior of the engine block. Furthermore, at least some known vehicle engines are assembled using a pallet-based support system. In known pallet-based support systems, a pallet is provided that includes a plurality of bolt-receiving apertures formed therein. Two or more posts are bolted to the pallet, using the bolt-receiving apertures. Two jigs are bolted to opposite sides of an engine block. After the jigs have been coupled to the engine block, the jigs can be positioned on the two or more posts, to support the engine block in either an upright or inverted orientation.

However, modern vehicle engines are becoming increasingly complex. Assembly of such engines may require access to more than just a top or a bottom surface of the engine block. In addition, the use of robotic systems for engine assembly, which may require access from above the engine block, is becoming more common. As a result, increased access to surfaces of an engine block from above is desired, to increase the percentage of assembly work surfaces done via robotics. However, known pallet-based support systems may limit the regions of the engine block that are accessible from above.

Accordingly, it is desirable to provide a pallet-based support system for use in the assembly of vehicle engines that facilitates access, from above, to surfaces of an engine block not limited to only the top and bottom areas of the engine block.

BRIEF DESCRIPTION

In one embodiment, a pallet-based support system for use in assembling a vehicle engine that includes an engine block is provided. The pallet-based support system includes a pallet. The support system also includes a first jig and a second jig configured to couple to the engine block. The support system also includes a first support arm and a second support arm extending from the pallet, wherein each of the support arms includes a cradle structure. The support system also includes a first adapter structure coupled to the first jig, such that the first adapter structure is configured to be releasably coupled to one of the cradle structures by lowering the engine block towards the pallet. The first adapter structure engages the cradle structure and is configured to be positioned in at least three orientations with respect to the cradle structure.

In another embodiment, a positioning assembly for use in assembling a vehicle engine that includes an engine block is provided. The positioning assembly includes at least one cradle structure located at an upper end of a support arm extending from a pallet. The positioning assembly also includes at least one jig configured to couple to the engine block. The positioning assembly also includes at least one adapter structure coupled to the at least one jig and configured to be releasably coupled to the at least one cradle structure by lowering of the engine block toward the pallet. The at least one adapter structure engages the at least one cradle structure and is configured to be positioned in at least three orientations with respect to said at least one cradle structure.

In yet another embodiment, a method of assembling a vehicle engine that includes an engine block is provided. The method includes coupling a first jig and a second jig to an engine block. The method also includes coupling a first support arm and a second support arm to a pallet, wherein each of the first and second support arms includes a cradle structure. The method also includes coupling a first adapter structure to the first jig and a second adapter structure to the second jig, each of the first and second adapter structures configured to be releasably coupled to one of the cradle structures. The method also includes lowering the engine block towards the pallet, such that the first and second adapter structures engage the cradle structures, such that the engine block is positioned one of at least three orientations with respect to the cradle structures.

The features, functions, and advantages that have been discussed can be achieved independently in various embodiments or may be combined in yet other embodiments, further details of which can be seen with reference to the following description and drawings.

BRIEF DESCRIPTION OF THE DRAWINGS

FIG. 6 is a perspective view of an engine block supported in an inverted orientation on an exemplary pallet-based support system.

FIG. 7 is a perspective view of the engine block shown in FIG. 6, supported with a front region of the engine block facing upwardly.

FIG. 8 is a perspective view of the engine block shown in FIG. 6, supported in an upright orientation.

FIG. 9 is a perspective view of the engine block shown in FIG. 6, supported with a rear region of the engine block facing upwardly.

DETAILED DESCRIPTION

The pallet-based support system described herein overcomes at least some of the limitations of known vehicle engine assembly pallet-based support systems by supporting an engine block in orientations not limited to an upright and an inverted orientation. More specifically, the pallet-based support system described herein includes an adapter structure that enables jigs to be coupled to engine blocks, and a cooperating cradle structure located at the upper ends of each of a pair of support arms coupleable to a standard assembly line pallet. By providing such cooperating adapter and cradle structures, the pallet-based support systems described herein enable an engine block to be oriented such that any of the top, bottom, front, and rear regions of an engine block may be selectively oriented to face upwardly, thus facilitating the use of robotic assembly devices for use in performing assembly procedures to portions of the engine block. As such, manual assembly of the engine block is facilitated to be reduced. Accordingly, the portion of assembly of a vehicle engine that can be performed by robotics is facilitated to be increased, and correspondingly, the cost of assembling a vehicle engine is reduced as compared to known assembly systems and methods.

As used herein, an element or step recited in the singular and proceeded with the word "a" or "an" should be understood as not excluding plural elements or steps unless such exclusion is explicitly recited. Furthermore, references to "one embodiment" of the present invention or the "exemplary embodiment" are not intended to be interpreted as excluding the existence of additional embodiments that also incorporate the recited features.

Figure 1:
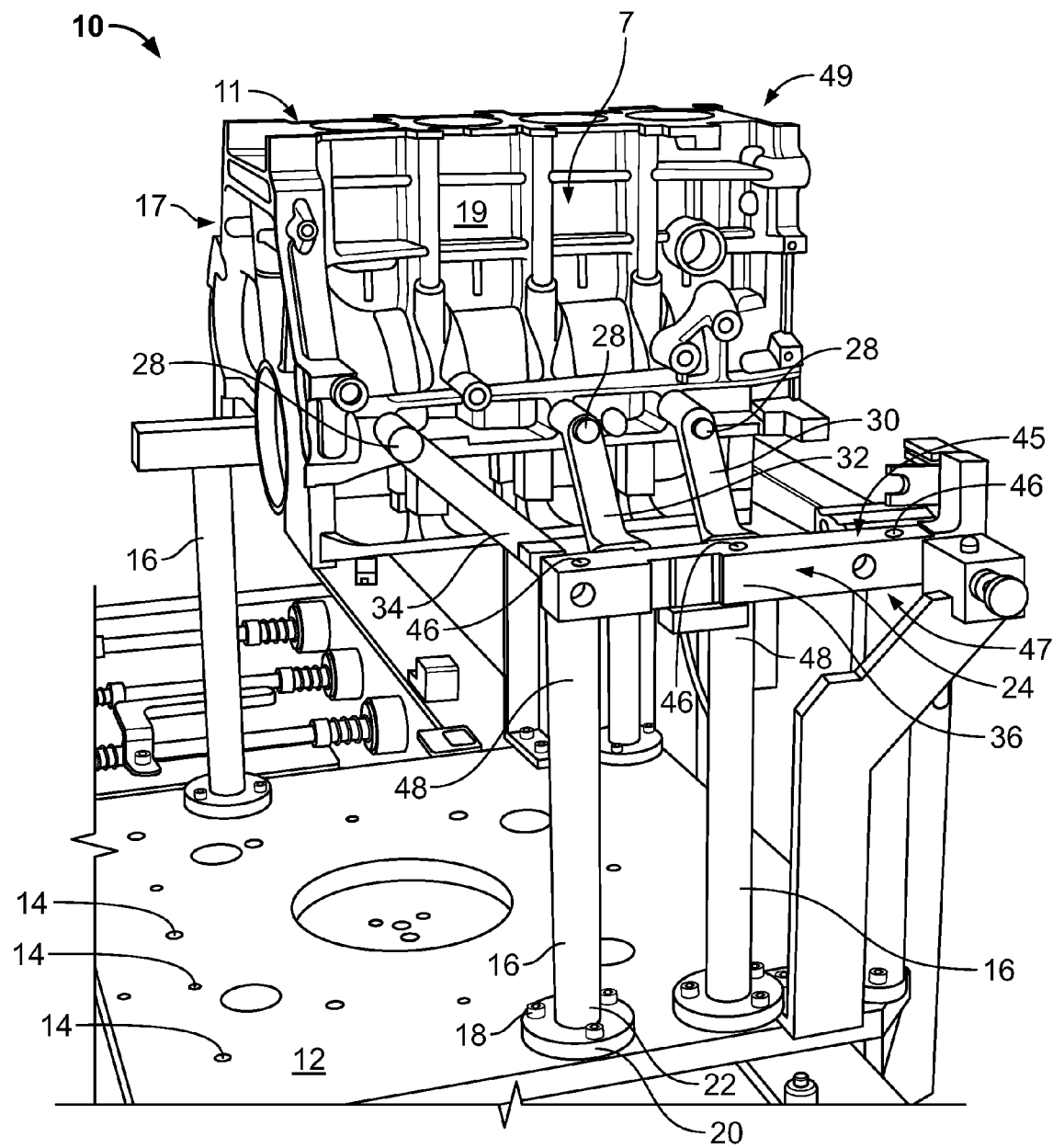
FIG. 1 is a perspective side view of an exemplary known pallet-based support system that may be used in assembling a vehicle engine.
Figure 2:
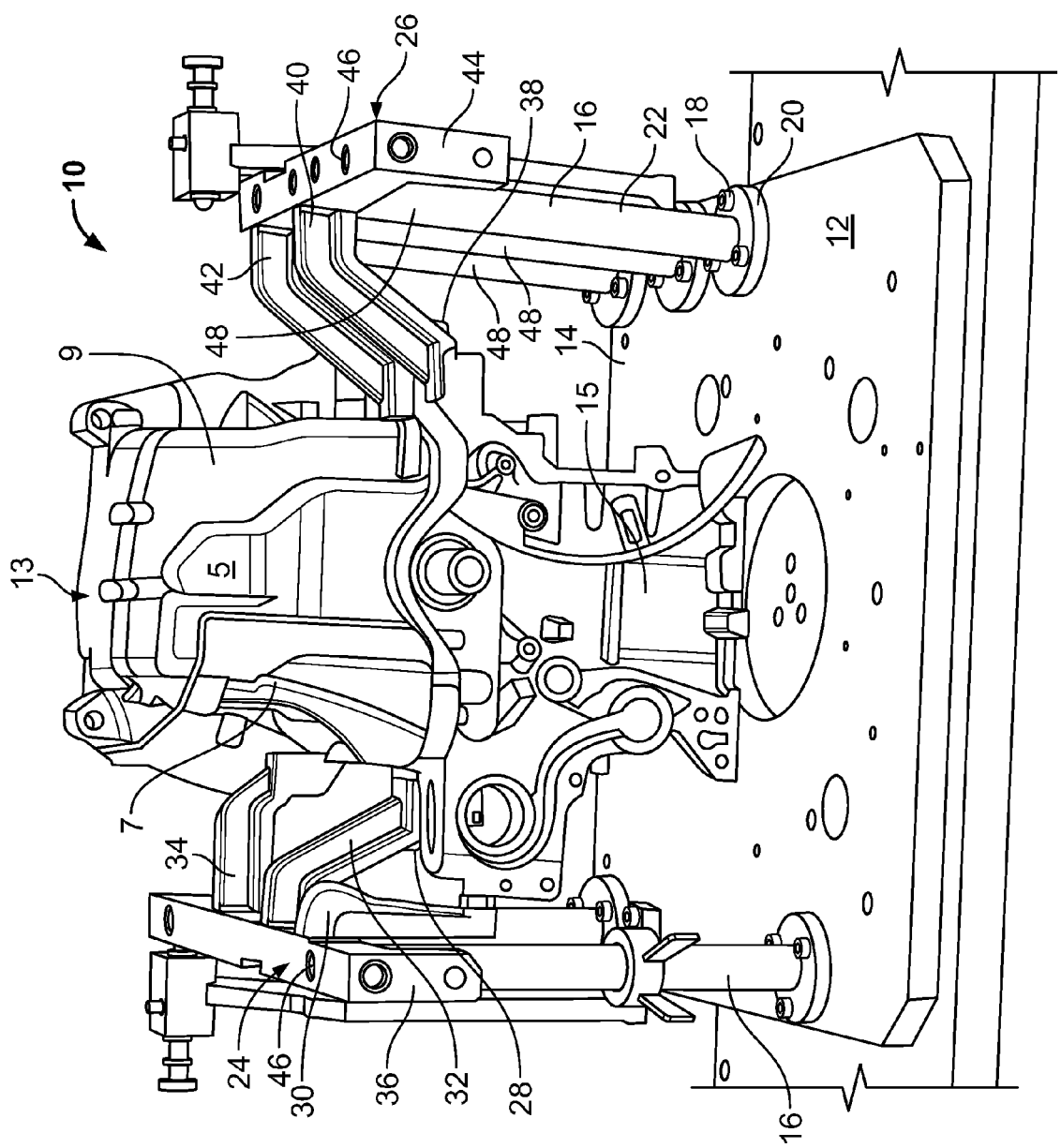
FIG. 2 is a perspective end view of the pallet-based support system shown in FIG. 1.

FIGS. 1 and 2 illustrate an exemplary engine block 19 supported using an exemplary known pallet-based support system 10. Specifically, FIG. 1 is a side perspective view of support system 10 and engine block 19 supported in an upright orientation, and FIG. 2 is an end perspective view of support system 10 and engine block 19, supported in an inverted orientation. Engine block 19 has a first side region 7, a second side region 9, a top region 11, a bottom region 13, a front region 15, and a rear region 17. Support system 10 includes a pallet 12 that includes a plurality of bolt-receiving apertures 14 defined therein. A plurality of support posts 16 are coupled to pallet 12 via bolts 18 secured through flanges 20 at lower ends 22 of support posts 16.

Two jigs 24 and 26 are coupled to engine block 19. Bolts 28 penetrate through arms 30, 32, and 34 extending from a longitudinal member 36 of jig 24, into first side region 7 of engine block 19. Bolts 38 penetrate through arms 40 and 42 extending from a longitudinal member 44 of jig 26 and extend into second side region 9 of engine block 19. Longitudinal members 36 and 44 each include apertures 46 that receive locator pins (not shown) that extend from upper ends 48 of support posts 16. Apertures 46 are defined along both upper and lower surfaces 45 and 47, respectively, of longitudinal members 36 and 44. In some known pallet-based support systems, apertures 46 may extend completely through longitudinal members 36 and 44.

Jigs 24 and 26, as illustrated in FIGS. 1 and 2, are not mirror-images of one another, inasmuch as engine block 19 is not bilaterally symmetrical. However, the configuration of jigs 24 and 26 may vary depending on the configuration of the particular engine block 19 to be supported. Specifically, the shape of engine block 19 dictates the configuration that jigs 24 and 26 must have to support engine block 19 in pallet-based support system 10. Accordingly, in some embodiments, jigs 24 and 26 may have mirror-image, or bilaterally symmetrical, configurations with respect to each other.

After jigs 24 and 26 have been securely coupled to engine block 19, a combined engine block and jig assembly 49 is formed that may be positioned in an upright orientation on support posts 16 (as shown in FIG. 1), by aligning apertures 46 with locator pins (not shown) extending from the upper ends 48 of support posts 16. If access to bottom region 13 of engine block 19 is desired, combined engine block and jig assembly 49 may be lifted off of support posts 16, using any suitable lifting system that enables pallet-based support system 10 to function as known in the art. Combined engine block jig assembly 49 may then be rotated 180°, and re-supported on support posts 16, as apertures 46 are aligned with the locator pins on support posts 16 (as shown in FIG. 2).

As described above, it is beneficial for robotic assembly systems to be able to access surfaces of an engine block 19 from above. While pallet-based support system 10 facilitates assembly of an engine from engine block 19, access to surfaces of engine block 19 from above is available only to top region 11 and bottom region 13 of engine block 19. Accordingly, engine components (not shown) inserted into, or attached to front region 15 or rear region 17 may require manual assembly, rather than robotic assembly.

Figure 3:
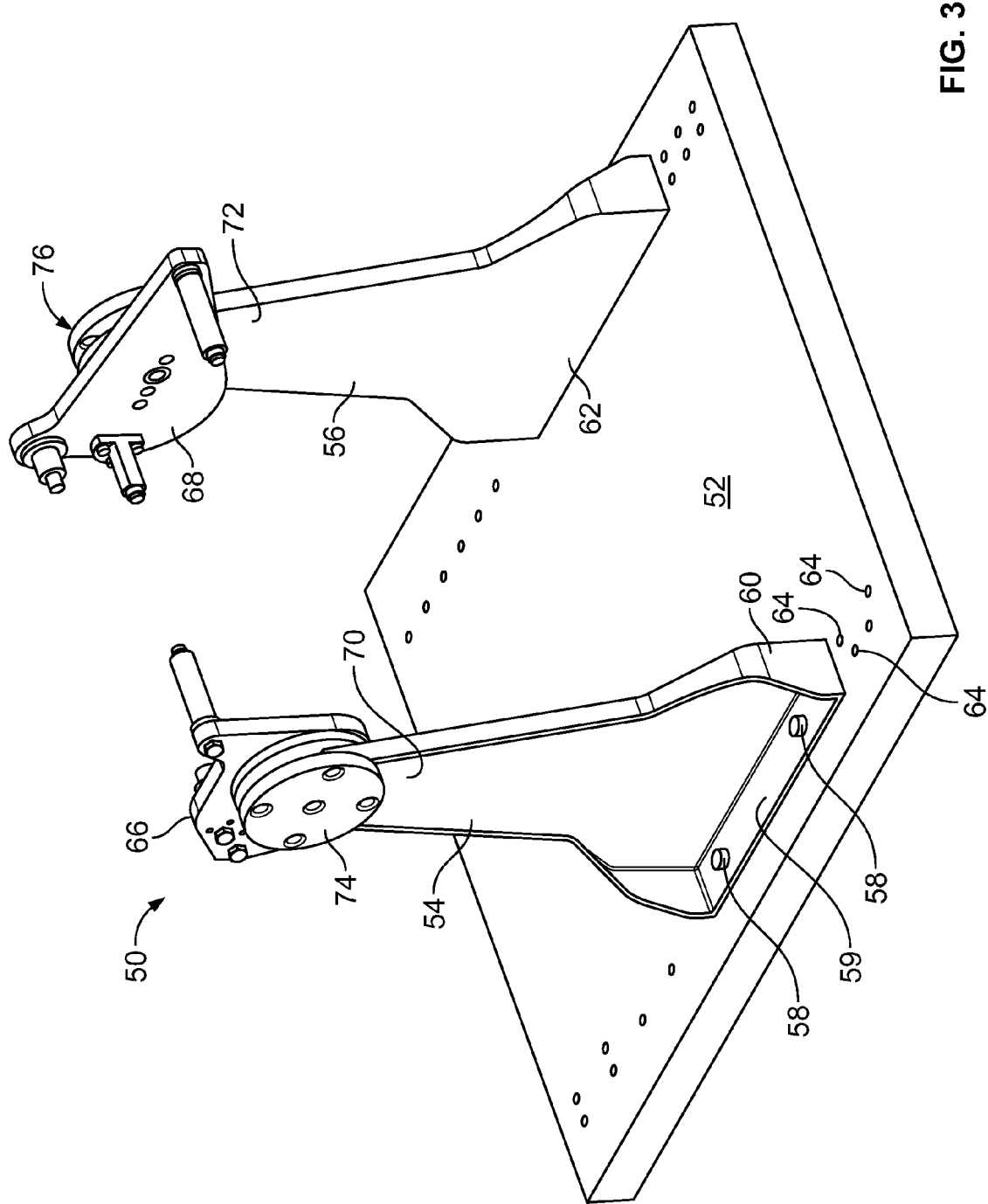
FIG. 3 is a perspective view of an exemplary pallet-based support system.

FIG. 3 is a top perspective view of an exemplary embodiment of a pallet-based support system 50 that may be used to support an engine block, such as engine block 19 shown in FIGS. 1 and 2. In the exemplary embodiment, support system 50 includes pallet 52, and support arms 54 and 56. Support arms 54 and 56 may be coupled to pallet 52 using any suitable known coupling technique that enables support system 50 to function as described herein. For example, support arms 54 and 56 may be coupled to pallet 52 by extending bolts 58 through flanges 59 in lower portions 60 and 62 of support arms 54 and 56, respectively, into receiving apertures 64 defined in pallet 52. Alternatively, support arms 54 and 56 may be securely coupled to pallet 52 using other coupling techniques, such as welding, for example. Jigs 66 and 68 are removably coupled to upper ends 70 and 72 of support arms 54 and 56, respectively, via adapters 74 and 76. Although jigs 66 and 68 are illustrated in FIG. 3 as having irregular shapes, it should understood that jigs 66 and 68 may have any configuration required in order to support an engine block, such as engine block 19 (shown in FIGS. 1 and 2) and/or engine block 150 (shown in FIG. 6).

Figure 4:
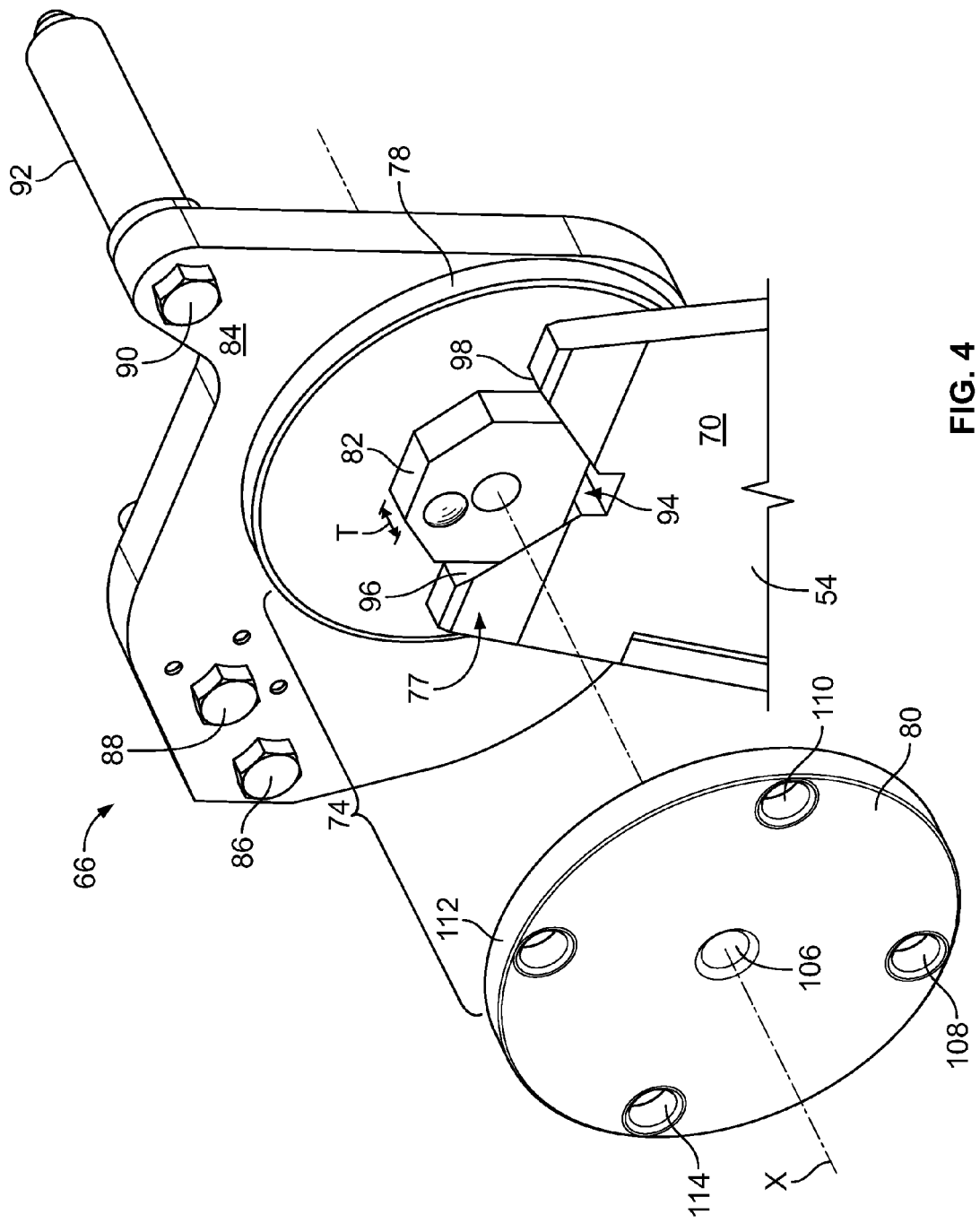
FIG. 4 is an exploded perspective view of an exemplary jig and support arm that may be used with the pallet-based support system shown in FIG. 3.
Figure 5:
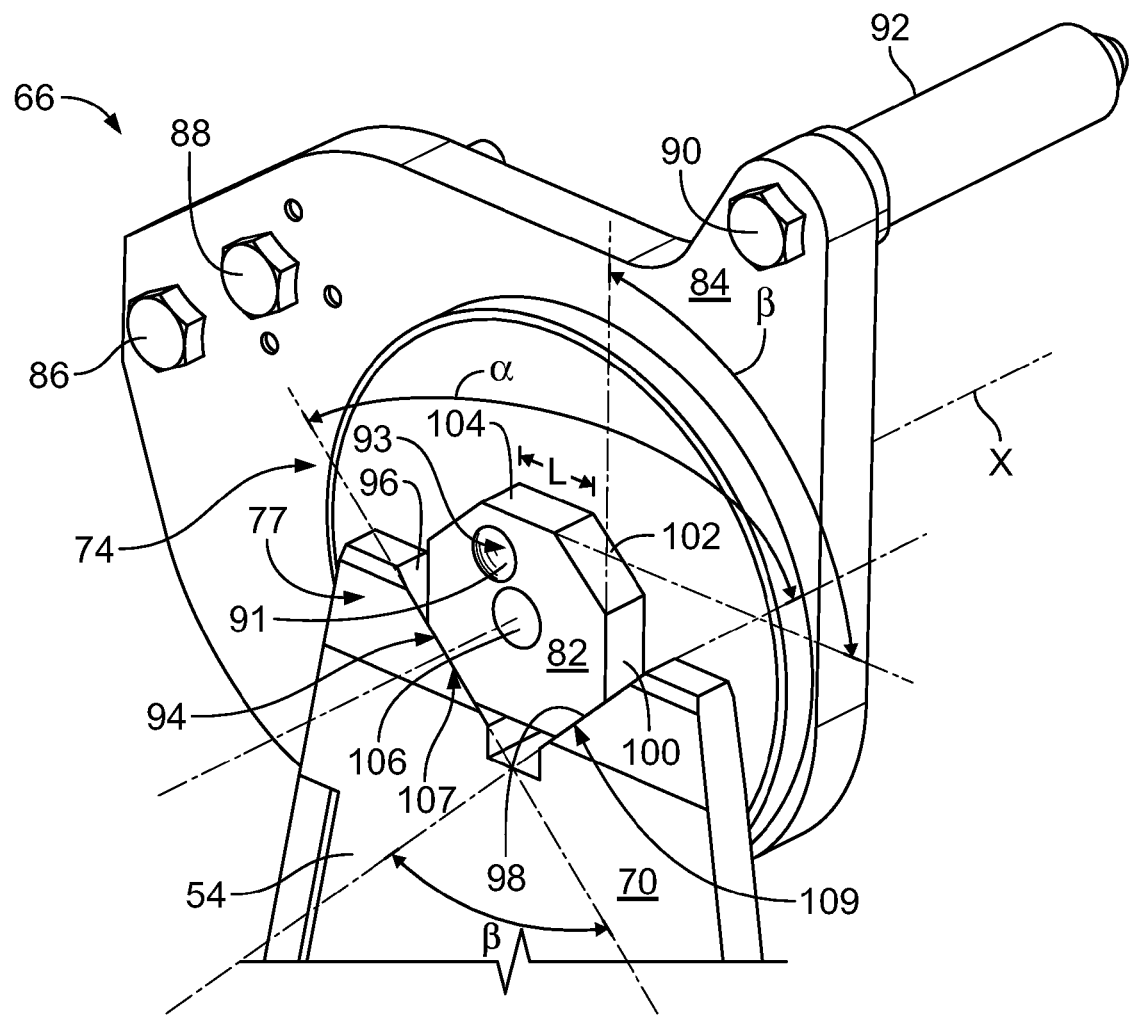
FIG. 5 is a cutaway perspective view of the jig and support arm shown in FIG. 4.

FIGS. 4 and 5 illustrate adapter 74 in further detail. It should be understood that in the exemplary embodiment, although jigs 66 and 68 may have asymmetrical configurations, alternatively in some embodiments, adapters 74 and 76 (shown in FIG. 3) may have configurations that are the same or that are mirror images of each other. FIG. 4 is an exploded perspective view of adapter 74, illustrating details of cradle structure 77 of support arm 54. In the exemplary embodiment, adapter 74 includes an inner plate 78 and an outer plate 80, coupled together via a shaped connector 82. FIG. 5 is a top perspective view of adapter 74 with outer plate 80 (shown in FIG. 4) removed to more clearly illustrate shaped connector 82 and its cooperation with cradle structure 77. In the exemplary embodiment, adapter 74 is coupled to jig 66 using any coupling technique that enables support system 50 to function as described herein. Jig 66 includes a longitudinal member 84, and fasteners 86, 88, and 90. In the exemplary embodiment, fasteners 86, 88, and 90 are bolts, and bolt 90 includes a bushing 92. Bolts 86 and 88 may likewise include bushings 92. In an alternative embodiment, any of bolts 86, 88 or 90 may be replaced with a non-threaded locator pin (not shown) and/or any other coupling member that enables support system 50 to function as described herein.

Referring to FIGS. 4 and 5, in the exemplary embodiment, cradle structure 77 includes a Y- or V-shaped notch 94 formed in support arm upper end 70. In the exemplary embodiment, a similar cradle structure is defined in upper end 72 of support arm 56 (shown in FIG. 3). Notch 94 includes two surfaces 96 and 98 that are oriented such that an included angle "α" defined therebetween. In the exemplary embodiment, angle α is approximately 90°. Shaped connector 82 couples inner plate 78 to outer plate 80. In the exemplary embodiment, shaped connector 82 has a generally octagonal cross-sectional configuration. Specifically, all of the "faces" of connector 82, including as faces 100, 102, and 104 have the same length L. As a result, an included angle β defined between faces 100 and 104, or between faces 107 and 109, of shaped connector 82, is likewise approximately 90°. In the exemplary embodiment, a cylindrical aperture 106 is defined within, and extends through plates 78 and 80, and shaped connector 82. Aperture 106 is substantially concentrically aligned with respect to a transversely-oriented axis X. Axis X extends through a corresponding aperture (not shown) in adapter 76, and extends transversely with respect to an engine block (not shown in FIG. 3), when supported by support system 50.

In the exemplary embodiment, shaped connector 82 has a thickness T, such that plates 78 and 80 mate closely about upper end 70 of support arm 54, to provide lateral stability to support system 50 when engine block 150 (shown in FIG. 6) is supported between jigs 66 and 68. Specifically, plates 78 and 80 cooperate to facilitate preventing lateral slip or rocking between cradle structure 77 and shaped connector 82 that might otherwise occur as pallet 52 is moved from location to location within an assembly plant (not shown).

In an exemplary embodiment, a plurality of transverse apertures 108, 110, 112, and 114 are defined within outer plate 80 that provide access points for a lifting and rotating device (not shown) for use in lifting and repositioning an engine block coupled to jigs 66 and 68 (shown in FIG. 3). More specifically, in the exemplary embodiment, each of apertures 108, 110, 112, and 114 are cylindrical. In the exemplary embodiment, a corresponding outer plate (not shown) of adapter 76 includes corresponding cylindrical transverse apertures. While four transverse apertures are illustrated in the embodiment of FIG. 4, in alternative embodiments, any number of transverse apertures may be defined, that are sufficient to enable support system 50 to function as described herein. In the exemplary embodiment, shaped connector 82 is octagonal in cross-section, but in alternative embodiments, shaped connector 82 may have any cross-sectional shape and/or more or less sides, provided that the number of sides is divisible by four, and that the shape enables support system 50 to function as described herein. Having at least a four-sided shaped connector 82 facilitates mating of connector 82 in close tolerance and with stability within notch 94, because the angle α defined between surfaces 96 and 98 is the same as angle β defined between alternate faces 100 and 104, or faces 107 and 109, of shaped connector 82. More specifically, in exemplary embodiments, shaped connector 82 generally includes either four (4) or eight (8) sides, and is oriented, with respect to plates 78 and 80, such that two (2) sides of shaped connector 82 form an upwardly-oriented "V" shape with 90° defined between them. Although in alternative embodiments, shaped connector 82 may include a number of sides that is a higher multiple of 4, such higher multiples produce shaped connectors 82 having sides with increasingly shorter lengths L. Shorter side lengths L may result in decreased rotational stability of shaped connectors 82 relative to cradle structures 77.

In the exemplary embodiment, shaped connector 82 may be coupled to plates 78 and 80 using any coupling technique sufficient to enable support system 50 to function as described herein. For example, shaped connector 82 may be coupled to plates 78 and 80 via bolts (not shown). Alternatively, shaped connector 82 may be coupled to plates 78 and 80 via other coupling techniques, including but not limited to, brazing and/or welding. In the exemplary embodiment, inner plate 80 may including a laterally-projecting locator pin 91 configured to extend through an aperture 93 (shown in FIG. 5) defined within shaped connector 82, such that alignment of shaped connector 82, relative to inner plate 80 is facilitated. Alternatively, locator pin 91 may extend from shaped connector 82 and into a suitably located aperture (not shown) in outer plate 80.

The operation of pallet-based support system 50 is illustrated in FIGS. 6-9, which illustrate an engine block 150 coupled to jigs 66 and 68. Pallet 52 has been omitted from FIGS. 6-9 for purposes of simplification of the illustrations. FIG. 6 illustrates engine block 150 in Position 1. Engine block 150, which includes bottom region 152 and rear region 154, is shown in an inverted orientation. FIG. 7 illustrates engine block 150 in Position 2, wherein engine block 150 is oriented such that a front region 156 faces upwardly. FIG. 8 illustrates engine block 150 in Position 3, wherein engine block 150 is oriented such that a top region 158 faces upwardly. FIG. 9 illustrates engine block 150 in Position 4, wherein engine block 150 is oriented such that rear region 154 faces upwardly.

To selectively reposition engine block 150 from Position 1 to Position 2, in which a front region 156 is facing upwardly, a lifting device (not shown) couples to adapters 74 and 76 (or alternatively, to jigs 66 and 68 directly), for example at one or more of apertures 108-114 (shown in FIG. 4), and lifts engine block 150, together with jigs 66 and 68 and corresponding adapters 74 and 76 (collectively referred to as "engine block assembly 162") off of support arms 54 and 56, rotates engine block assembly 162 clockwise (as shown in FIG. 2) 90°, and lowers engine block assembly 162 down onto support arms 54 and 56. The lifting device (not shown) may be of any suitable configuration sufficient to enable support system 50 to function as described. To successively reposition engine block assembly 162 to Positions 3 or 4, the lifting device lifts engine block assembly 162 off of support arms 54 and 56, and rotates assembly 162 clockwise in the direction of arrow A about axis X. Rotation of assembly 162 may also be counterclockwise with respect to axis X, that is, in a direction opposite to arrow A, as required by the assembly operation for engine block 150. As long as assembly 162 is rotated 90° (or a multiple thereof), when lowered onto support arms 54 and 56, adapters 74 and 76 mate with cradle structures 77 and prevent further rotation or other movement of assembly 162, to enable assembly operations to be performed on engine block 150.

The above-described systems and methods overcome at least some disadvantages of known pallet-based support systems by providing a pallet-based support system for use with vehicle engine components that enables an engine block to be supported in a plurality of positions. More specifically, the embodiments described herein include a pallet-based support system that enables an engine block to be rotatably repositioned about a transverse axis that extends perpendicularly to a longitudinal axis of the engine block, such that top-down access is provided not only to top and bottom regions of the engine block, but also to front and rear regions of the engine block. Such improved top-down accessibility facilitates the increased use of robotic assembly devices for assembly of vehicle engines, resulting in reduced assembly costs. In addition, the pallet-based support systems described herein includes an adapter structure coupleable to known engine block jigs that cooperates with a support arm cradle structure coupled to or included within support arms coupled to known pallet structures.

Exemplary embodiments of a pallet-based support for assembling vehicle engines and methods of assembling vehicle engines are described above in detail. The systems and methods are not limited to the specific embodiments described herein, but rather, components of the systems and/or steps of the methods may be utilized independently and separately from other components and/or steps described herein. For example, the systems may also be used in combination with other manufacturing systems and methods, and is not limited to practice with only the manufacturing systems and methods as described herein. Rather, an exemplary embodiment can be implemented and utilized in connection with many other vehicle assembly system applications.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A pallet-based support system for use in assembling a vehicle engine that includes an engine block, said pallet-based support system comprising:
   a pallet;
   a first engine block jig;
   a second engine block jig;
   a first support arm extending from said pallet, said first support arm comprising a first cradle structure;
   a second support arm extending from said pallet, said second support arm comprising a second cradle structure;
   a first adapter structure coupled to said first engine block jig and rotatably positionable on said first cradle structure in at least three different angular orientations of said first engine block jig; and
   a second adapter structure coupled to said second engine block jig and rotatably positionable on said second cradle structure in at least three different angular orientations of said second engine block jig; wherein each of said first cradle structure and said second cradle structure comprises a notch, each of said first adapter structure and said second adapter structure being rotatably positioned in said notch of the respective one of said first cradle structure and said second cradle structure.

2. A pallet-based support system in accordance with claim 1, wherein each of said first adapter structure and said second adapter structure is rotatably positionable on its respective one of said first cradle structure and said second cradle structure in at least four different angular orientations of its respective one of said first engine block jig and said second engine block jig.

3. A pallet-based support system in accordance with claim 1, wherein each of said notches has opposed sides that define an approximately 90° angle α between said sides.

4. A pallet-based support system in accordance with claim 3, wherein each of said first adapter structure and said second adapter structure comprises a polygonal connector rotatably positionable in said notch of its respective one of said first cradle structure and said second cradle structure.

5. A pallet-based support system in accordance with claim 1, wherein each of said first adapter structure and said second adapter structure is positionable on its respective one of said first cradle structure and said second cradle structure such that each of said first adapter structure and said second adapter structure is detachable from and rotatably repositionable on its respective one of said first cradle structure and said second cradle structure in the at least three different angular orientations of its respective one of said first engine block jig and said second engine block jig.

6. A pallet-based support system in accordance with claim 1, wherein each of said first adapter structure and said second adapter structure comprises at least one plate positionable alongside its respective one of said first cradle structure and said second cradle structure when each of said first adapter structure and said second adapter structure is positioned on its respective one of said first cradle structure and said second cradle structure such that said at least one plate of each of said first adapter structure and said second adapter structure facilitates restricting lateral motion of each of said first adapter structure and said second adapter structure relative to its respective one of said first cradle structure and said second cradle structure.

7. A pallet-based support system in accordance with claim 6, wherein said at least one plate is a detachable component of its respective one of said first adapter structure and said second adapter structure.

8. A positioning assembly for use in assembling a vehicle engine that includes an engine block, said positioning assembly comprising:
   at least one pallet-mountable cradle structure;
   at least one engine block jig; and
   at least one adapter structure coupled to said at least one engine block jig, said at least one adapter structure positionable on said at least one cradle structure such that said at least one adapter structure is detachable from said at least one cradle structure and rotatably repositionable on said at least one cradle structure in at least three different angular orientations of said at least one engine block jig; wherein said at least one adapter structure comprises at least one plate positioned alongside said at least one cradle structure when said at least one adapter structure is positioned on said at least one cradle structure to facilitate restricting lateral motion of said at least one adapter structure relative to said at least one cradle structure.

9. A positioning assembly in accordance with claim 8, wherein said at least one adapter structure is rotatably repositionable on said at least one cradle structure in at least four different angular orientations of said at least one engine block jig.

10. A positioning assembly in accordance with claim 8, wherein said at least one cradle structure comprises at least one notch in which said at least one adapter structure is rotatably repositionable.

11. A positioning assembly in accordance with claim 10, wherein said at least one notch has opposed sides that define an approximately 90° angle α between said sides.

12. A positioning assembly in accordance with claim 11, wherein said at least one adapter structure comprises at least one polygonal connector rotatably repositionable in said at least one notch.

13. A positioning assembly in accordance with claim 12, wherein said at least one polygonal connector is at least one octagonal connector.

14. A positioning assembly in accordance with claim 8, wherein said at least one plate is at least one detachable component of said at least one adapter structure.

* * * * *